(12) United States Patent
Hewitt et al.

(10) Patent No.: US 11,802,821 B2
(45) Date of Patent: Oct. 31, 2023

(54) MODULE FOR FREEZING AND STORAGE OF FROZEN TISSUE

(71) Applicants: The USA as represented by the Secretary, Department of Health and Human Services, Bethesda, MD (US); Michael Oshetski, Horseheads, NY (US)

(72) Inventors: Stephen M. Hewitt, Bethesda, MD (US); Jeffrey C. Hanson, Bethesda, MD (US); Kris R. Ylaya, Bethesda, MD (US); Michael Oshetski, Horseheads, NY (US)

(73) Assignee: The United States of America, as represented by the Secretary, Departmentof Health and Human Services, Bethesda, MD (US)

( * ) Notice: Subject to any disclaimer, the term of this patent is extended or adjusted under 35 U.S.C. 154(b) by 1161 days.

(21) Appl. No.: 16/338,860

(22) PCT Filed: Sep. 29, 2017

(86) PCT No.: PCT/US2017/054531
§ 371 (c)(1),
(2) Date: Apr. 2, 2019

(87) PCT Pub. No.: WO2018/067407
PCT Pub. Date: Apr. 12, 2018

(65) Prior Publication Data
US 2021/0262906 A1    Aug. 26, 2021

Related U.S. Application Data

(60) Provisional application No. 62/403,585, filed on Oct. 3, 2016.

(51) Int. Cl.
| | |
|---|---|
| G01N 1/00 | (2006.01) |
| G01N 1/36 | (2006.01) |
| B01L 3/00 | (2006.01) |
| G01N 1/42 | (2006.01) |
| G01N 1/31 | (2006.01) |

(52) U.S. Cl.
CPC ................ *G01N 1/36* (2013.01); *B01L 3/508* (2013.01); *G01N 1/42* (2013.01);
(Continued)

(58) Field of Classification Search
None
See application file for complete search history.

(56) References Cited

U.S. PATENT DOCUMENTS 3,982,862 A    9/1976 Pickett et al.
5,358,692 A    10/1994 Reynolds
(Continued)

FOREIGN PATENT DOCUMENTS

JP    2006 300745    11/2006

OTHER PUBLICATIONS

International Search Report and Written Opinion issued for International Application No. PCT/US2017/054531 dated Mar. 19, 2018.
(Continued)

*Primary Examiner* — Jyoti Nagpaul
(74) *Attorney, Agent, or Firm* — Leydig, Voit & Mayer, Ltd.

(57) ABSTRACT

An article comprising:
a planar base having a first surface and an opposing second surface and an outer peripheral edge, wherein the second surface includes an area comprising a plurality of protuberances and configured to attach and maintain orientation of a frozen tissue specimen block; and
a removable lid having a first side and a second side, wherein the first side defines a continuous planar sur-
(Continued)

face and the second side defines a recessed portion configured to cover a frozen tissue specimen block and an outer rim configured to engage with the outer peripheral edge of the base, wherein the outer rim does not form part of the recessed portion, wherein the area of the base and the recessed portion of the lid are aligned.

12 Claims, 7 Drawing Sheets

(52) U.S. Cl.
CPC . *B01L 2300/041* (2013.01); *B01L 2300/0609* (2013.01); *G01N 2001/315* (2013.01); *G01N 2001/366* (2013.01)

(56) References Cited

U.S. PATENT DOCUMENTS

| | | |
|---|---|---|
| 7,172,558 B2 | 2/2007 | Olson, Jr. |
| 8,151,593 B2 | 4/2012 | Henderson et al. |
| 2004/0262318 A1 | 12/2004 | Buia et al. |
| 2011/0008884 A1* | 1/2011 | Morales .................. G01N 1/06 435/325 |
| 2014/0298926 A1 | 10/2014 | Kenrick et al. |

OTHER PUBLICATIONS

ProviaLabs, LLC "Proviasettes," http://www.provialabs.com/product-page/set-of-21/proviasettes downloaded Apr. 2, 2019.

* cited by examiner

MODULE FOR FREEZING AND STORAGE OF FROZEN TISSUE

CROSS REFERENCE TO RELATED APPLICATION

This application is the U.S. National Stage of International Application No. PCT/US2017/054531, filed Sep. 29, 2017, which was published in English under PCT Article 21(2), which in turn claims the benefit of U.S. Provisional Application No. 62/403,585, filed Oct. 3, 2016, which is herein incorporated by reference in its entirety.

BACKGROUND

Tissue that is surgically removed from patients or subjects is routinely frozen for both diagnostic and research needs. There is a lack of standardization in freezing protocols, partially driven by utility. Tissue obtained from frozen sections for histopathologic evaluation under the microscope is routinely frozen in a freezing compound, the most commonly used is OCT (Optimal Cutting Temperature—a mixture of polyproplyglycols, sucrose and water). Tissue obtained for research, or destined for a biobank is routinely frozen in the same matrix. This matrix has the benefit of protecting the tissue, as well as functioning as an embedding matrix for the preparation of frozen sections on a cryotome.

Currently, there is no routine method of storage of OCT embedded tissue after freezing. Small molds may help position and orient the tissue, but a protective enclosure that can be labeled and does not require the tissue to be partially thawed for use (cryosection, TMA production, other sampling) does not exist.

SUMMARY

Disclosed herein in one embodiment is an article comprising:
 a planar base having a first surface and an opposing second surface and an outer peripheral edge, wherein the second surface includes an area comprising a plurality of protuberances and configured to attach and maintain orientation of a frozen tissue specimen block; and
 a removable lid having a first side and a second side, wherein the first side defines a continuous planar surface and the second side defines a recessed portion configured to cover a frozen tissue specimen block and an outer rim configured to engage with the outer peripheral edge of the base, wherein the outer rim does not form part of the recessed portion,
 wherein the area of the base and the recessed portion of the lid are aligned.

Also disclosed herein is a frozen tissue specimen storage kit comprising:
 a base having a first surface and an opposing second surface and an outer peripheral edge, wherein the second surface includes an area comprising a plurality of protuberances and configured to attach and maintain orientation of a frozen tissue specimen block;
 a removable lid having a (i) first side and a second side, wherein the first side defines a continuous planar surface and the second side defines a recessed portion configured to cover a frozen tissue specimen block and (ii) an outer rim configured to engage with the outer peripheral edge of the base;
 a slotted U-shaped clamp configured to receive the base and a tissue specimen mold that is aligned with the area of the base; and
 a chuck configured for mounting at least the base onto a cryostat.

Further disclosed herein is a method for preparing a frozen tissue specimen block comprising:
 placing a tissue specimen and matrix material into a mold having an opening;
 contacting the mold with a base having a first surface and an opposing second surface and an outer peripheral edge, wherein the second surface includes a holding area comprising a plurality of protuberances, such that the mold opening aligns with the holding area of the base;
 subjecting the base/mold/tissue specimen to a temperature sufficient to freeze the matrix material resulting in a frozen tissue specimen block disposed on the holding area of the base;
 coupling a lid to the base, wherein the lid has a (i) first side and a second side, wherein the first side defines a continuous planar surface and the second side defines a recessed portion configured to cover the frozen tissue specimen block, and (ii) an outer rim engaged with the outer peripheral edge of the base.

Additionally disclosed is a method for microtome sectioning a frozen tissue specimen block comprising:
 providing a frozen tissue specimen block stored inside a holder, the holder comprising (i) a base having a first surface and an opposing second surface and an outer peripheral edge, wherein the second surface includes a frozen tissue specimen attachment area comprising a plurality of protuberances, and (ii) a lid having a recessed portion configured to cover the frozen tissue specimen block;
 mounting a chuck onto a cryostat, wherein the chuck has a peripheral rim;
 coupling the base of the holder to the chuck via engaging the peripheral edge of the base with the peripheral rim of the chuck;
 removing the lid from the base to present a frozen tissue specimen block extending from the second surface of the base; and
 microtome sectioning the frozen tissue specimen block.

The foregoing will become more apparent from the following detailed description, which proceeds with reference to the accompanying figures.

DETAILED DESCRIPTION

Disclosed herein are devices and methods for freezing and storing tissue samples, particularly biological tissue samples that are prepared for cryosectioning, archiving as frozen tissue, or subsequently fixed and processed as surgical specimens. Currently, the handling, labeling and storage of OCT-embedded frozen tissue is complicated, with ad hoc solutions applied, and no standardization. The vexing issue, well documented in the literature, is the temperature fluctuation that occurs in frozen tissue handling, resulting in specimen degradation. A second, but equally problematic issue is specimen labeling. No current solution allows for a durable label to be affixed to the OCT embedded specimen. Disclosed herein is an insulated storage unit, with integrated labeling, that addresses these problems.

In general, a tissue specimen is placed in a mold and a freezing matrix material (e.g., OCT) is applied to the tissue sample via introduction of the freezing matrix material into the mold. The freezing matrix material may fully or partially encompass the tissue sample. The resulting matrix material-embedded tissue is secured or placed onto a base (optionally via a Slotted U-shaped clamp). The mold/base/tissue sample is then frozen (along with optional Slotted U-shaped clamp). In certain embodiments, the base and a cooperating lid are snapped shut, and the entirety of the base/tissue sample/lid unit is then frozen. Freezing may be accomplished by a variety of methods including placing the unit in a freezer, placing the unit in freezing bath (e.g., isopentane, liquid nitrogen, dry ice (with or without an ethanol slurry), or placing the unit on a frozen surface. The freezing process secures the base to the frozen block of freezing matrix material and tissue. After freezing, the mold can be removed (in the embodiments with the lid the lid can also be removed). The base is coupled to a chuck, meaning that the chuck is mounted with the frozen tissue available for immediate cryosectioning. After cryosectioning, the lid is replaced and the specimen is placed in an appropriate freezer. Alternatively the unit can be immediately archived for future use.

In a further embodiment, after cryosectioning the lid is placed onto the base, and the resulting unit is immersed in a fixative, such as neutral buffered formalin or other solutions at room temperature. Although the freezing matrix material will dissolve, the tissue specimen is retained in the orientation that it was cryosectioned. This alignment facilitates the production of well-aligned permanent section for evaluation by a pathologist for diagnosis confirmation after rendering a preliminary frozen section diagnosis.

Figure 1:
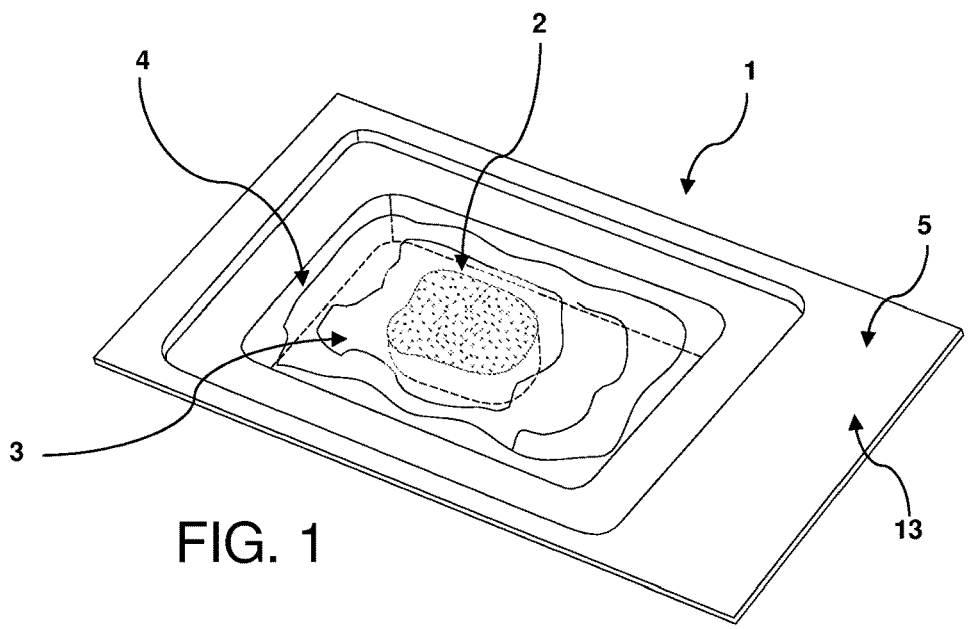
FIG. 1 is a perspective view of a mold holding a tissue specimen.

A mold is provided for embedding a tissue specimen in a matrix material. The matrix material may be any material suitable for freezing while maintaining the integrity of the tissue specimen. Illustrative matrix materials include water, saline, honey, sucrose and other sugar solutions, including those that contain formaldehyde, polyethylene glycol solutions. Freezing media include compounds of: saline solutions; sugar solution, most commonly sucrose and trehalose; polyethylene glycols; cellulose agarose; and latex. The matrix material may contain other chemicals, including fixatives, such as ethanol, formaldehyde, acids (acetic and picric for examples) and other chemical solutions that undergo a phase transition from gel (viscous liquid) to a solid under change of temperature (typically cooling, however heating (hydrogel) Particular matrix materials are optimal cutting temperature compound (OCT, e.g., Tissue Tek™ available from Sakura Finetek, Jung Tissue Freezing Medium, or Leica Microsystems Surgipath FSC 22 Frozen Section Compound). The mold may be any mold suitable for holding a tissue specimen and the matrix material. An example of a mold 1 is shown in FIG. 1. The mold 1 includes a cavity 4 into which a tissue specimen 2 is placed. The mold can have differing depths and shapes. For example, some molds are round. Typical round molds have a 10-20 mm diameter, and a 5-10 mm depth. Typical rectilinear molds are 10-30 mm on sides, and 5-10 mm depth. A liquid matrix material 3 is introduced into the mold cavity 4 to partially or fully encompass the tissue specimen 2. The mold may include a flange 5, or a similar element, for handling and positioning the mold as required. In certain embodiments, the mold is made from a flexible material such as, for example, clear plastic.

Figure 2:
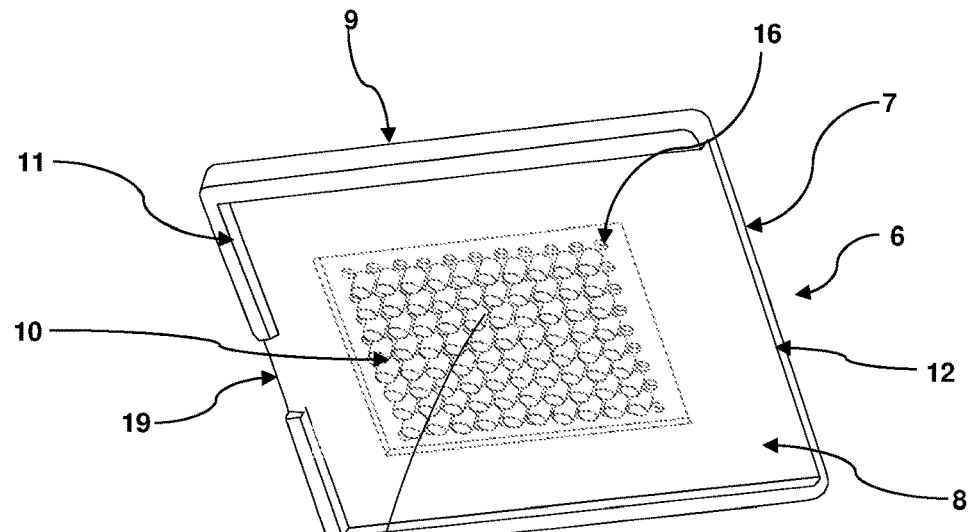
FIG. 2 is a perspective view of a mold and a unit base.
Figure 2:
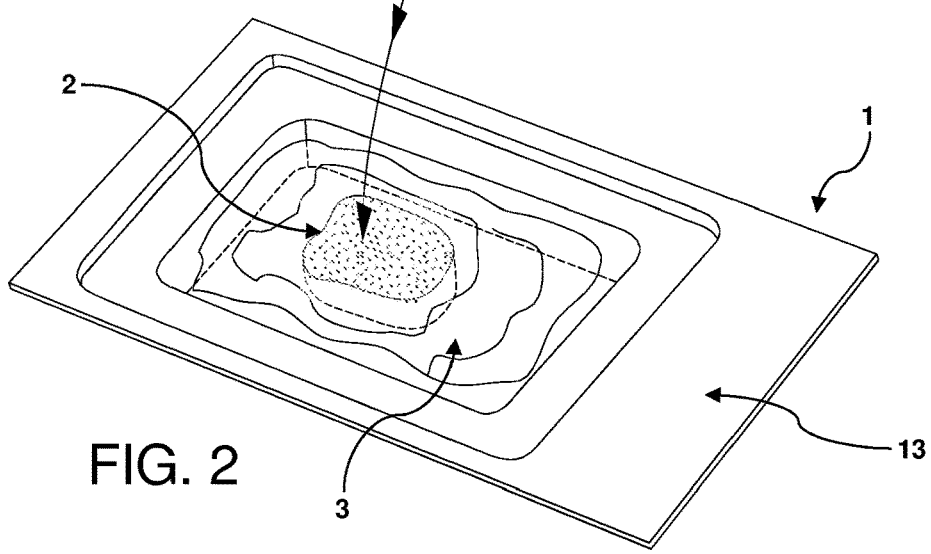

A base then is aligned and placed on the mold that contains the tissue specimen and the matrix material to form a mold/base construct. An example of a planar base 6 is shown in FIG. 2. The base 6 includes a first surface 7 and an opposing second surface 8. The base 6 also defines an outer peripheral edge 9. The base 6 further includes protuberances 10 extending from the second surface 8. The protuberances 10 may be in the form of an array of individual small bumps or small projections. The protuberances array may be centered on the second surface 8. The protuberances assist in holding the tissue specimen in place.

The base 6 further includes a ridge 11 at the peripheral edge 9 on three sides of the base. In certain embodiments, the ridge 11 could be provided on two sides or four sides of the base. In certain embodiments, if a circular mold is used the ridge 11 could be a matching circular shape. The ridge 11 is low in height (e.g., 0.5 to 2 mm) and can be 1.5-2.5 mm in width and does not constitute laterally extending walls. The mold 1 fits into the base 6 as shown in FIG. 2 such that the peripheral edges of the mold flange 5 contact the ridge 11 on multiple sides (e.g., three sides) of the base 6. Thus, the ridge 11 retains the mold 1 forming a mold/base construct 20 as demonstrated in FIG. 3. The second surface 8 of the base 6 contacts the mold 1 so that the second surface 8 covers the mold cavity 4. In particular, the base protuberances 10 are aligned with and contact a layer of matrix material disposed on top of the tissue specimen 2. The edge 12 of the base 6 that does not include a ridge receives an optional extension 13 of the mold flange 5. An opening 19 is present in the ridge 11 opposite the edge 12 of the base 6. The opening 19 provides a means for un-snapping the base from other components as described in more detail below. The base 6 also includes a plurality of holes 16 extending from the first surface 7 to the second surface 8. The holes 16 permit discharge of excess freezing matrix material when the assembly is placed in a slotted U-shaped clamp as described below. In certain embodiments, the base does not include any holes.

In another embodiment of the base 6, the ridge 11 is present on all four sides of the base. In this embodiment, the mold fits inside the ridges 11.

Figure 7:
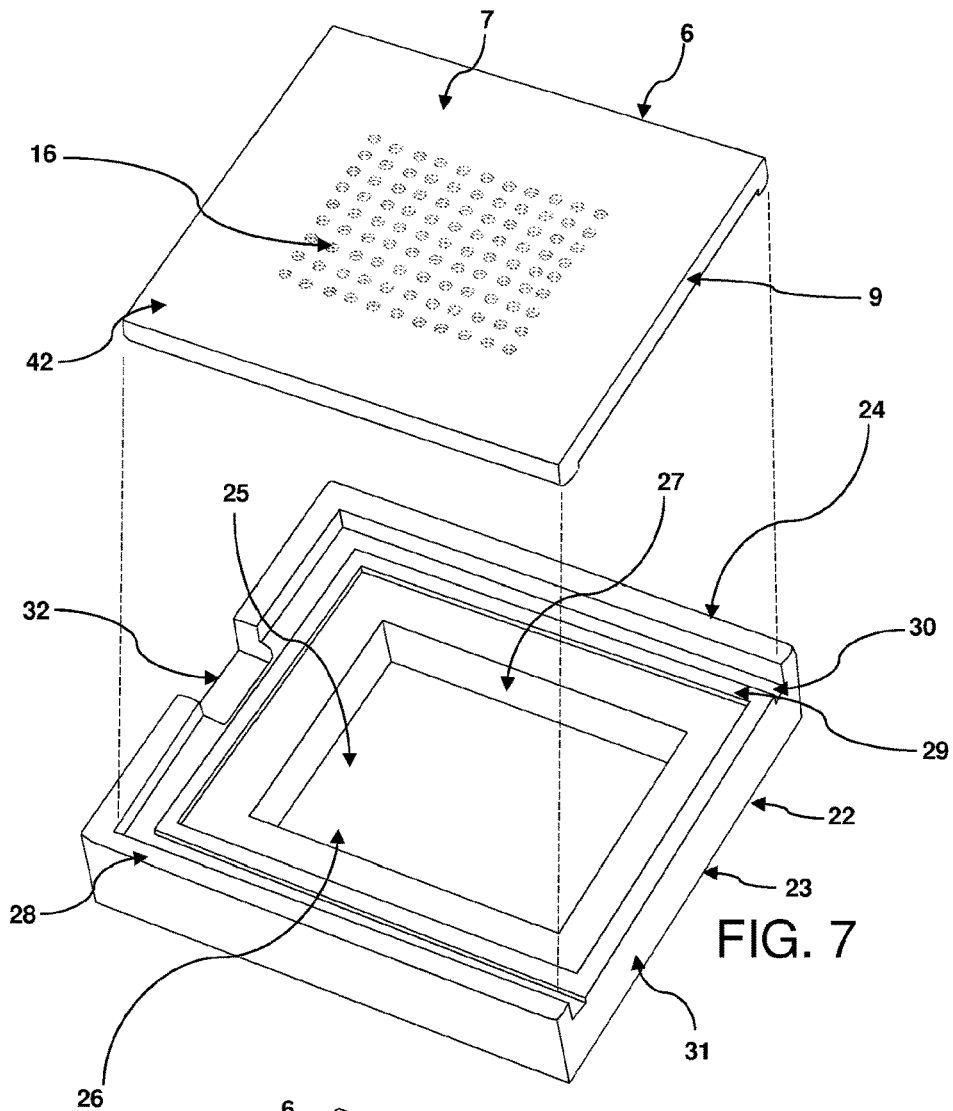
FIG. 7 is a perspective view of the base and lid.
Figure 11:
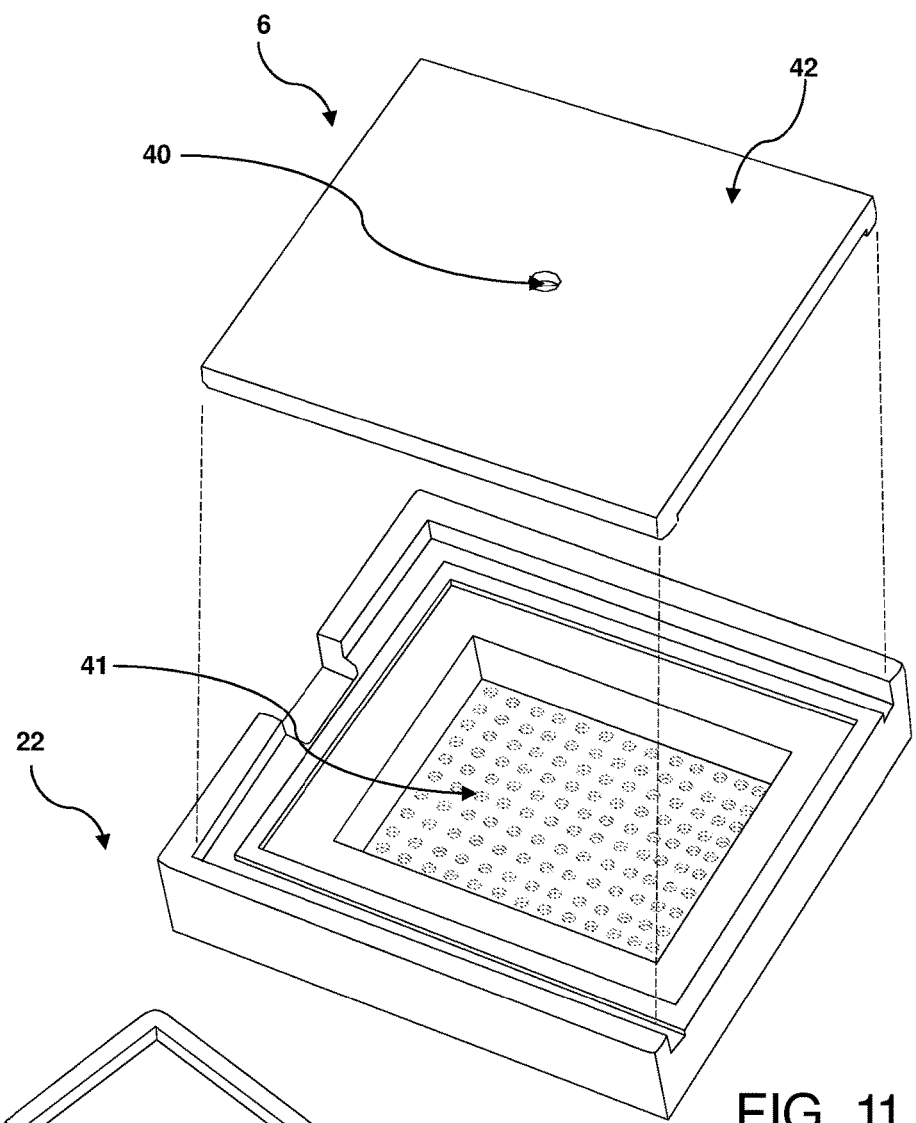
FIG. 11 is a perspective view of another embodiment of the base and lid.

The base also include an area 42 for labeling (shown in FIGS. 7 and 11). For example, a label identifying the specific specimen may be affixed to the facing-out first surface 7. Illustrative labeling includes mechanical engraving or inscribing, writing in pencil or solvent resistant pen or printer, affixing an adhesive label (including a barcode), or affixing or embedding an RFID tag. Since the base travels with the specimen during processing, the label ensures that chain-of-custody for the specimen is maintained.

Figure 3:
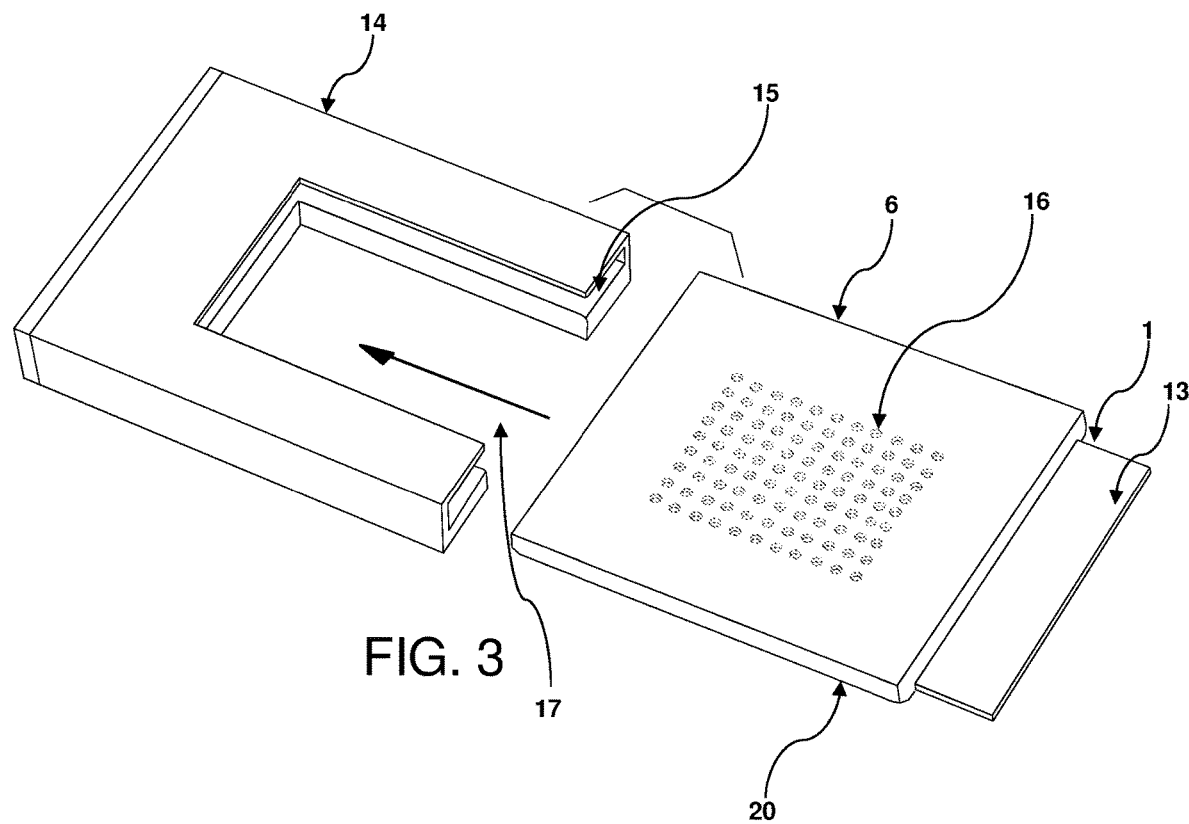
FIG. 3 is a perspective view of a mold/base construct for inserting into a slotted U-shaped clamp.
Figure 4:
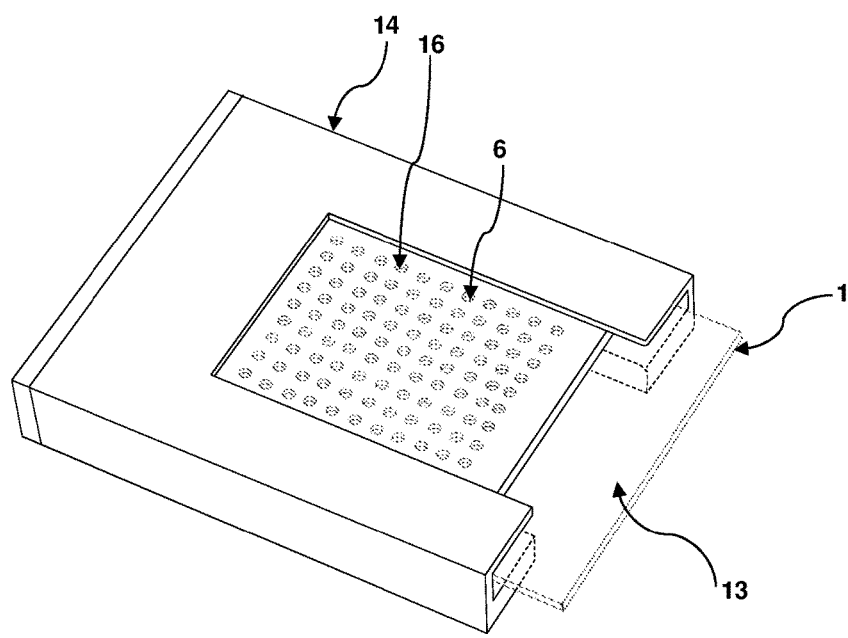
FIG. 4 is a perspective view of the mold/base construct inserted into the slotted U-shaped clamp.
Figure 5:
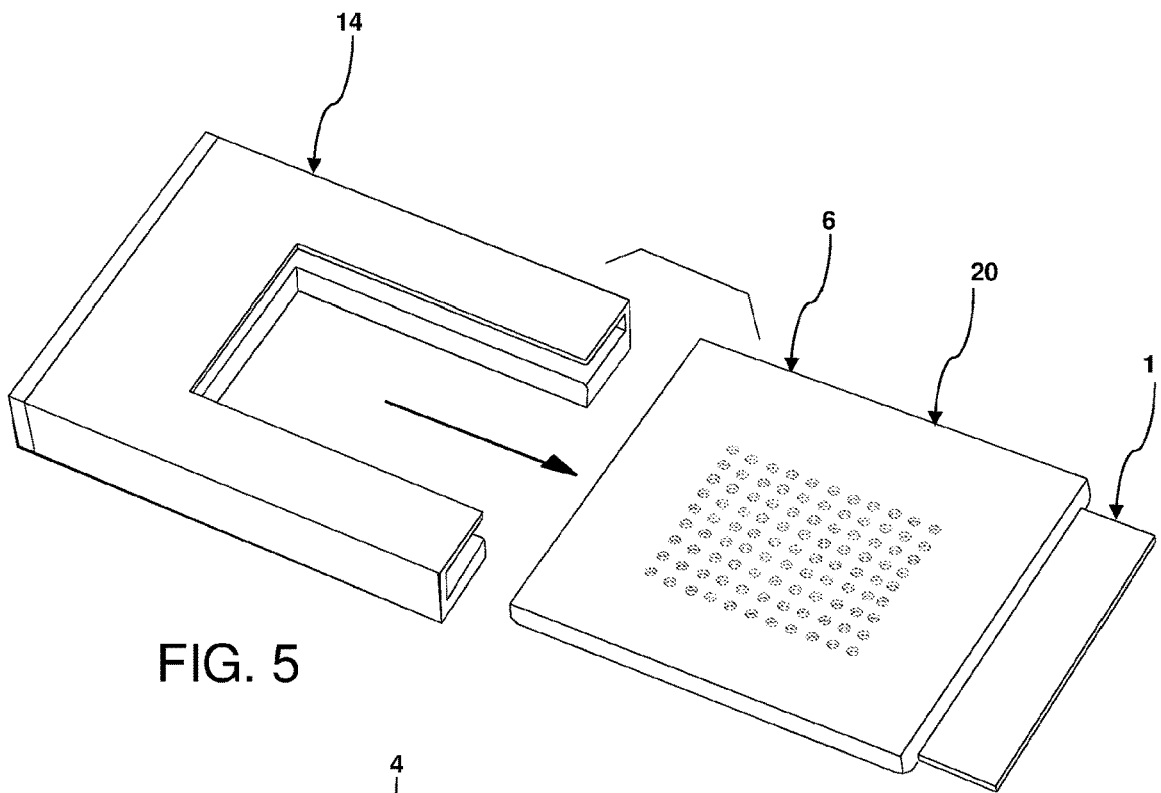
FIG. 5 is a perspective view of a mold/base construct removed from the slotted U-shaped clamp.
Figure 6:
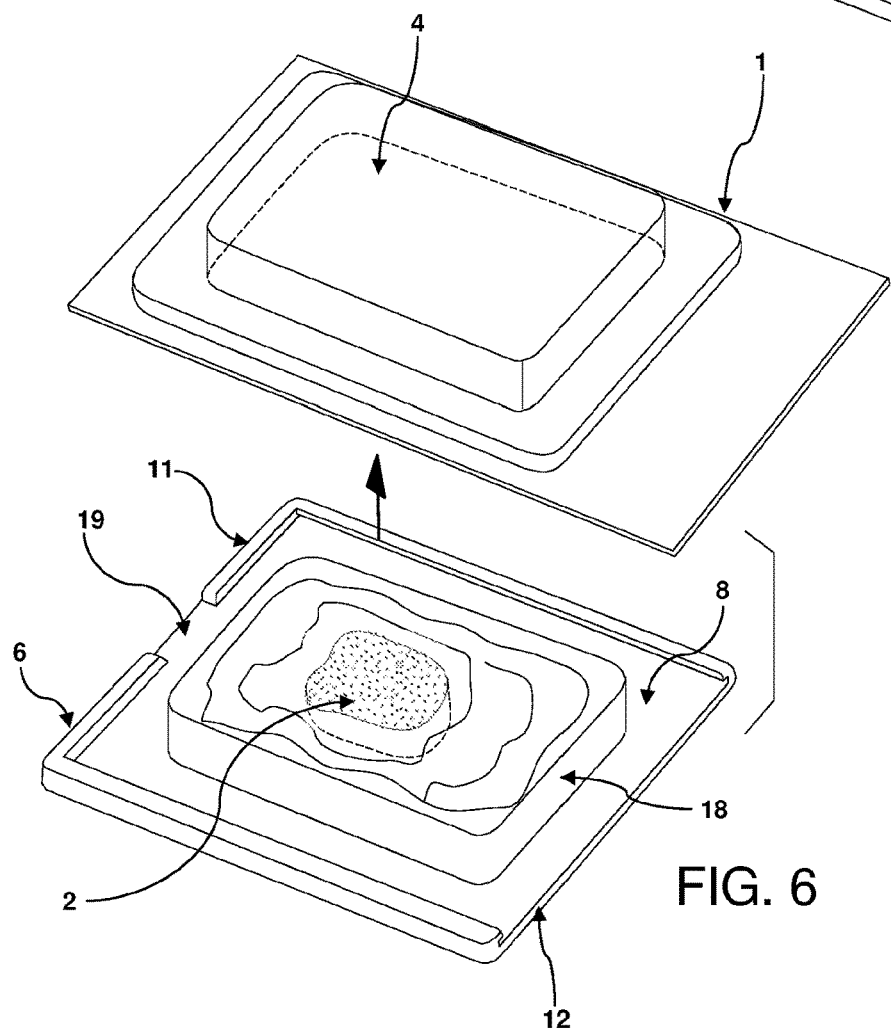
FIG. 6 is a perspective view of the mold removed from the base.

In certain embodiments as shown in FIGS. 3-5 a slotted U-shaped clamp 14 is used for securing the mold to the base during freezing. The slotted U-shaped clamp 14 includes a slot 15 and an open end 17. The base 6 and mold 1 (i.e., the mold/base construct 20) are together slid into the open end 17 of the slotted U-shaped clamp 14 via inserting the base 6 and mold 1 together into the slot 15 provided in the slotted U-shaped clamp 14 and the base 6 and mold 1. In certain embodiments, the slot 15 may be offset from the vertical center of the U-shaped clamp 14 resulting in relatively flat mold/base construct 20. For example, the slot 15 may be 2 mm from one surface of the U-shaped clamp 14 and 4.5 mm from the opposing surface of the U-shaped clamp 14. In certain embodiments, the mold extension 13 extends beyond the open end 17 of the slotted U-shaped clamp 14 to provide a means for holding the mold and base while inserting and removing the mold and base. In other embodiments, the base has a sufficient length to enclose mold extension 13. In certain embodiments, the slotted U-shaped clamp can accept the mold extension into the clamp to provide more surface area for clamping. The slotted U-shaped clamp 14 holding the mold/base construct 20 (see FIG. 4) then is subjected to a temperature sufficient for freezing the matrix material and tissue specimen resulting in converting the tissue specimen block into a frozen tissue specimen block 33 (block 33 is shown in FIGS. 6, 8B and 8C). The temperature depends upon the specific matrix material. The freezing temperature may range, for example, from 0 to −196° C., more particularly 0 to −4° C. The freezing, base protuberances 10 and/or base holes 16 are sufficient for securing the matrix material and tissue specimen onto the second surface 8 of the base. After formation of the frozen tissue specimen block 18, the mold/base construct 20 is removed from the slotted U-shaped clamp 14 as shown in FIG. 5.

After formation of the frozen tissue specimen block, the mold is removed from the base. The mold is a smooth material that is sufficiently flexible, even at low temperatures, and it is snapped, peeled, or pulled off. An example is shown in FIG. 6. The mold 1 can be removed by grasping the mold flange extension 13 and separating the mold 1 from the base 6. After removal of the mold, the tissue specimen block 33 extends from the second surface 8 of the base 6. In certain embodiments, the tissue specimen block 33 is centered on the second surface 8 of the base 6. The tissue specimen block 33 also is supported in a standalone position on the second surface 8. In other words, the tissue block 33 is not surrounded by, or retained by, any external walls.

Figure 8A:
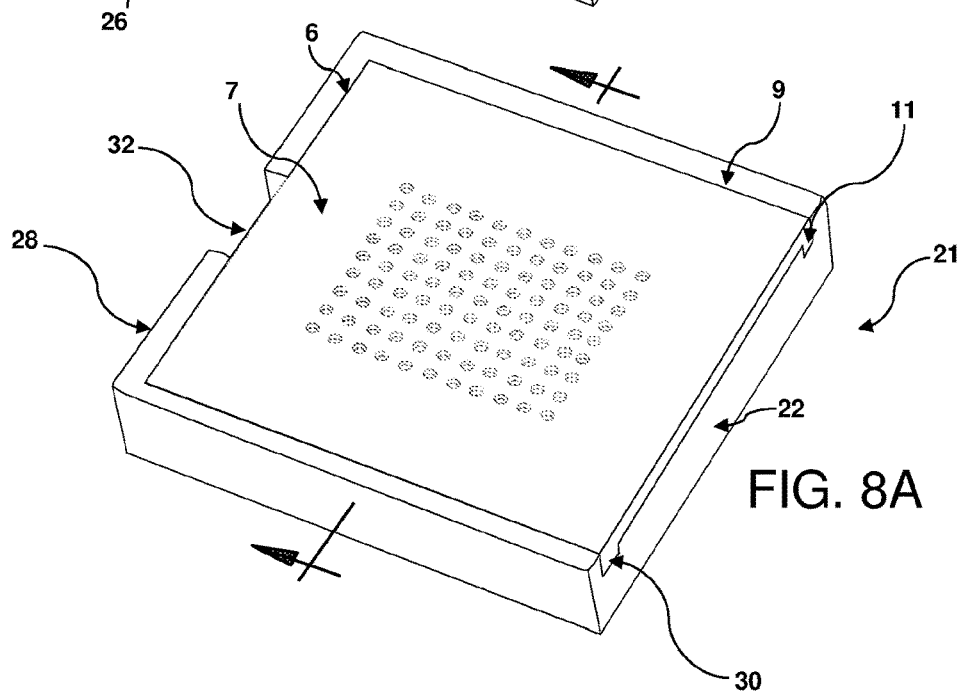
FIG. 8A is a perspective view of the base/lid assembly.
Figure 8B:
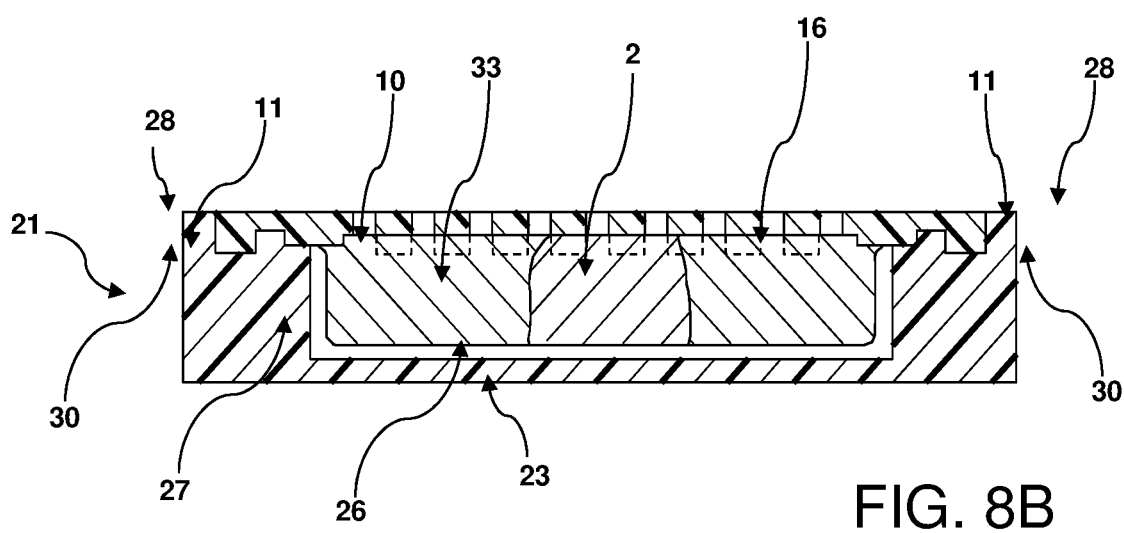
FIGS. 8B and 8C are cross-section views of different embodiments of the base/lid assembly view in the direction shown in FIG. 8A.
Figure 8C:
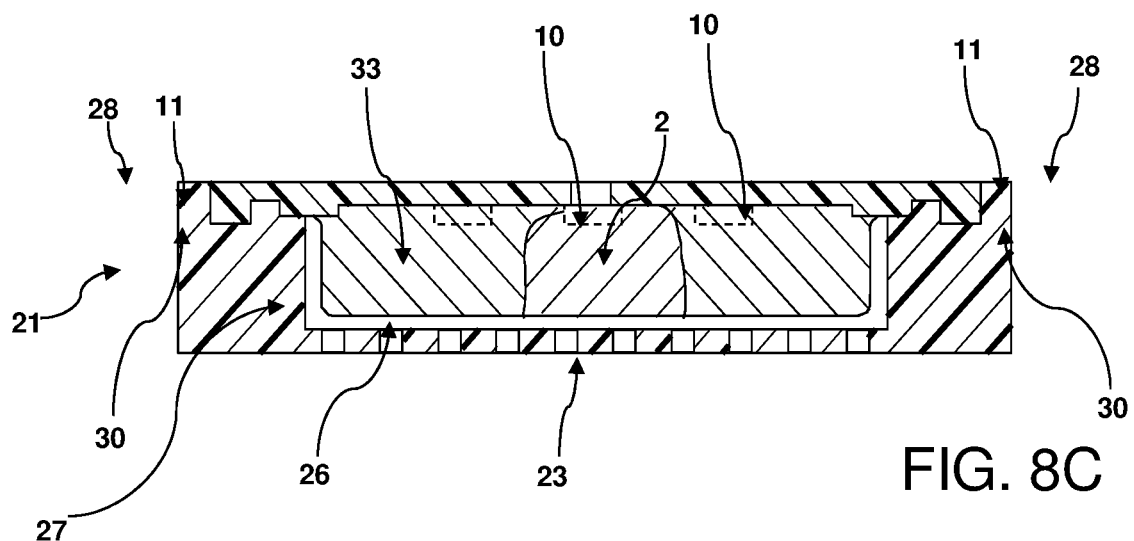

The base holding the tissue specimen block may be coupled with a lid to form a base/lid construct 21 (see FIGS. 8A, 8B and 8C). In certain embodiments, the lid and base are snapped together. Base/lid construct 21 is for storage of the frozen tissue block in a controlled environment. In certain embodiments, the base holding the tissue specimen block may be attached to a chuck that is, in turn, attached to a cryostat as described in more detail below. The tissue specimen may then be cryosectioned prior to coupling of the lid.

An example of a lid 22 is shown in FIG. 7. The lid 22 has a first side 23 and an opposing second side 24. The first side 23 defines a continuous planar surface. The second side 24 defines a recessed portion 25 configured to cover the tissue specimen block. The recessed portion 25 includes a bottom 26 and laterally extending walls 27. In FIGS. 8B and 8C the frozen tissue specimen block 33 does not contact the bottom 26 or walls 27 of the recessed portion 25.

The lid 22 also includes an outer rim 28 configured to engage with the outer peripheral edge 9 of the base 6. In certain embodiments, the outer rim 28 and the peripheral edge are snap-fit together such that the lid 22 and the base 6 are can be coupled and de-coupled from each other. The outer rim 28 does not form part of the recessed portion 25 due to presence of a shelf 29 disposed between the outer rim 28 and the walls 27 of the recessed portion 25. In certain embodiments, the outer rim 28 extends upwards from the shelf 29. The peripheral dimension of the outer rim 28 is such that the peripheral edges 9 of the base 6 fit within the outer rim 28. In certain embodiments, the shelf 29 defines a slot 30 located contiguous to the outer rim 28 and that engages with the ridge 11 of the base 6. In certain embodiments the outer rim 28 is present on only three peripheral sides of the lid 22 that coincide with the three peripheral sides of the base 6 at which the ridge 11 is also present. Thus, the lid 22 is removably coupled to the base 6 via a snap-fit constructed between (a) the outer rim 28 of the lid 22 and the peripheral edge 9 of the base 6 and (b) slot 30 of the lid 22 and the ridge 11 of the base 6.

One side 31 of the lid 22 does not include the outer rim 28. An opening 32 is present in the outer rim 28 opposite the side 31 of the lid 22. The location of lid outer rim opening 32 coincides with the location of the base ridge opening 19. Openings 32 and 19 cooperate to provide an opening for insertion of a fingernail or a mechanical lever for un-snapping the base 6 from the lid 22.

Figure 12:
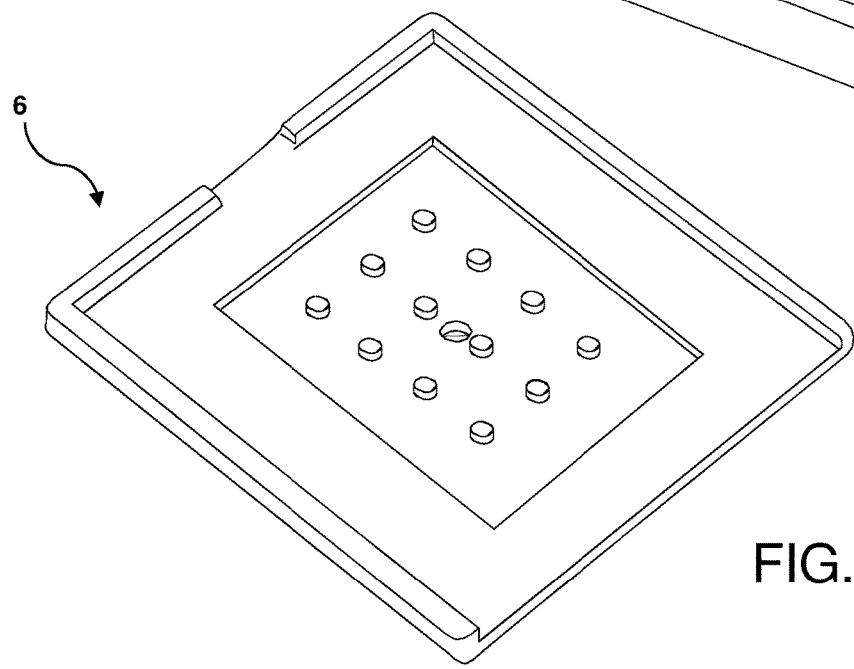
FIG. 12 is a perspective view of another embodiment of the base.

Another embodiment of a lid and a base is shown in FIGS. 11 and 12. In this embodiment, the base includes a single, centered hole 40 that permits exiting of excess freezing matrix material. The lid includes a plurality of holes 41 extending through the recessed portion bottom 26. The holes 41 allow access for a liquid fixative into the base/lid construct holding a tissue specimen, for example, when the construct is immersed in the liquid fixative.

The final assembly shown in FIGS. 8A, 8B and 8C stores the frozen tissue specimen block 33 between the base 6 and the lid 22. The final assembly also may have an outside surface area for labeling, for example, written, barcode (printed), adhesive label, or an integrated RFID tag. The closed assembly protects the tissue specimen from deformation and thermal isolations and shock, within the freezer (small changes in temp), during handling, inventory and management (moving from freezers), as well as provides insulation when in transfer. The fact that the lid can be removed while the base remains in a freezing compartment or on a frozen plate/surface, and the base affixed and cut, without melting/and embedding means the tissue does not have to have a freeze-thaw cycle to cut new sections after storage. The assembly is modular so that it will fit in existing storage units commonly used in research and clinical settings, with the label readily presentable. In certain embodiments, the dimensions of the final assembly are sufficiently large to hold a whole body organ (e.g., primate brain, kidney, etc.) cross-section. In certain embodiments, the dimensions of the final assembly may be 2 to 160 mm in length, 2 to 160 mm in width, and 2 to 50 mm in thickness. In certain embodiments, the dimensions may be 2.8×4.0×6.0 mm. In certain embodiments, the dimensions may be up to 40×60× 15 mm. In certain embodiments, the assembly is affordable so that it can be a single use object. The modular device disclosed herein is designed to work with any tissue holders on cryostats or freezing mold models.

The lid and base may be made from any suitable material. The material should be temperature-stable (i.e., insulative), resist solvents such as xylene or alcohols, and resist fixatives such as neutral buffered formalin. Acrylonitrile butadiene styrene (ABS) and polyamide (e.g., nylon) are illustrative plastics for making the device.

Figure 9:
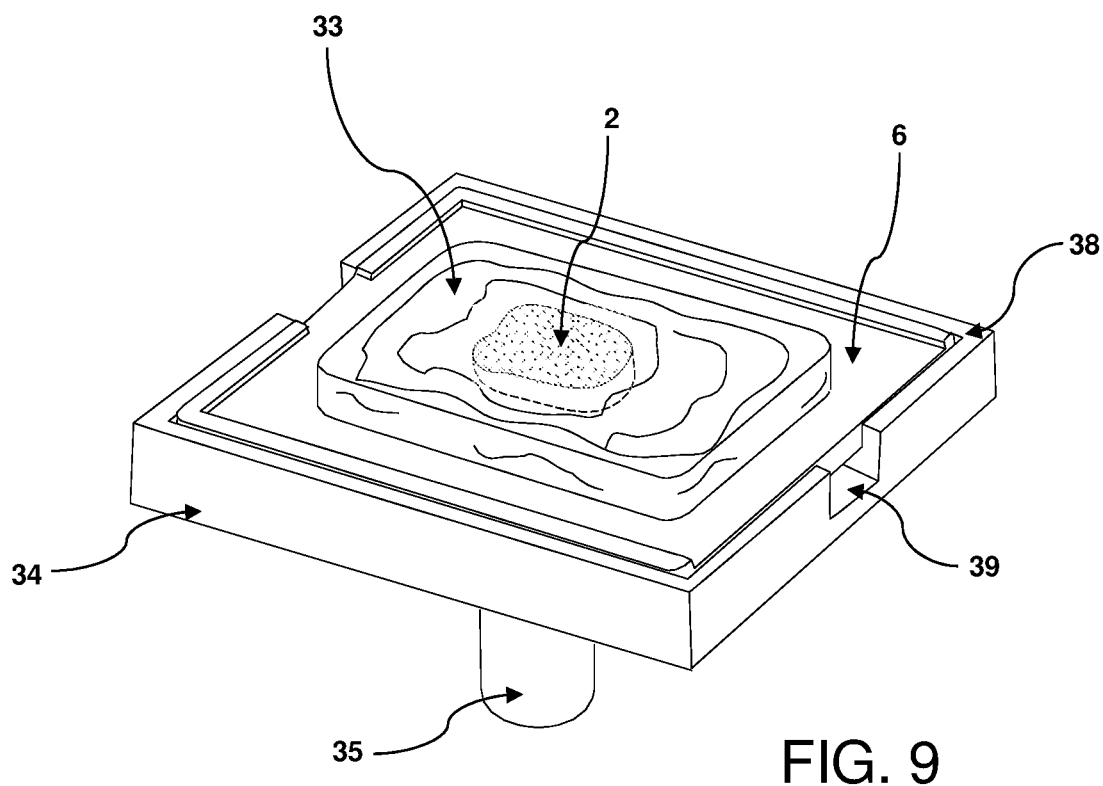
FIG. 9 is a perspective view of a chuck mount that is retaining the base that holds a frozen tissue specimen block.
Figure 10:
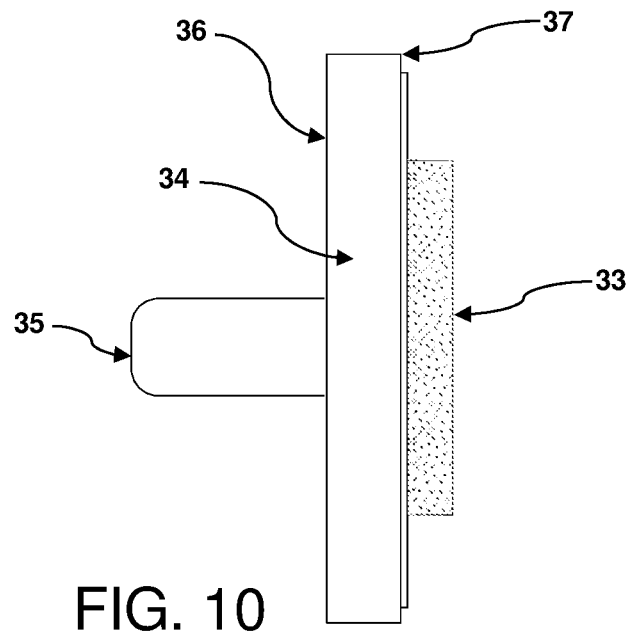
FIG. 10 is a side view of a chuck mount that is retaining the base that holds a frozen tissue specimen block.

In certain embodiments the base that holds the frozen tissue specimen may be attached to a chuck that is, in turn, attached to a cryostat. For example, as shown in FIGS. 9 and 10, a chuck 34 is provided with an arm 35 for mounting the chuck onto a cryostat. The arm 35 may be in the form of a cylinder or shaft that extends from a first surface 36 of the chuck 34. The chuck 34 includes a second surface 37 opposing the first surface 36. The base 6 may be attached to the second surface 37 of the chuck 34. For instance, the second surface 37 may define a peripheral raised rim 38 that is dimensioned to receive the base 6. The first surface 7 of the base contacts the second surface 37 of the chuck 34. In certain embodiments, the raised rim may include at least one opening 39 into which a fingernail or mechanical lever can be inserted for removing the base from the chuck. The lid 22 is removed from the base 6 thus making the frozen tissue specimen available for cryosectioning.

An illustrative process is described below:

A thin layer of freezing medium is usually applied to the bottom of the well of the cryomold. The tissue is then placed in the mold. The freezing matrix material is then added around the tissue until the mold is full, being careful not to displace the tissue when filling the mold. The open side of the mold is up as to not spill the freezing matrix material. Place the base structured side down, the edges of the base align it to the freezing mold. At this point wipe off extraneous freezing media. Slide the mold and base into the slotted U-shaped clamp and freeze. After freezing is complete any excess freeing media should be scraped off. Once frozen the rough surface of the base will secure the frozen block of freezing medium and tissue to the base. The cryomold can now be removed and discarded.

The articles and methods disclosed herein will facilitate specimen handling where the frozen tissue goes from a cryostat to a tissue processing cassette without manipulation. There is an incentive for this, as it will preserve the "cut face" of the tissue to allow better matching of the frozen sections to the permanent sections, a critical and complicated aspect of quality assurance in surgical pathology.

In view of the many possible embodiments to which the principles of the disclosed devices and methods may be applied, it should be recognized that the illustrated embodiments are only preferred examples of the invention and should not be taken as limiting the scope of the invention.

What is claimed is:

1. An article comprising:
    a planar base having a first surface and an opposing second surface and an outer peripheral edge, wherein the second surface includes an area comprising a plurality of protuberances;
    a tissue specimen mold having an opening; and
    a slotted U-shaped clamp configured to receive the planar base and the tissue specimen mold,
    wherein the tissue specimen mold is suitable for holding a tissue specimen embedded in a liquid matrix material between the planar base and the tissue specimen mold that, when frozen, forms a frozen tissue specimen block, and
    wherein the slotted U-shaped clamp secures the tissue specimen mold to the planar base such that the opening of the tissue specimen mold is aligned with the area of the second surface of the planar base.

2. The article of claim 1, further comprising a removable lid having: (i) a first side and a second side, wherein the first side defines a continuous planar surface and the second side defines a recessed portion configured to cover the frozen tissue specimen block; and (ii) an outer rim configured to engage with the outer peripheral edge of the base, wherein the outer rim does not form part of the recessed portion, and wherein the outer rim of the removable lid comprises a ridge on only three sides of the lid.

3. The article of claim 2, wherein the second surface of the planar base comprises a ridge on only three sides of the planar base configured to receive the tissue specimen mold.

4. The article of claim 3, wherein the second side of the removable lid further defines a slot contiguous with the outer rim and the slot is configured to engage with the ridge of the planar base.

5. The article of claim 2, wherein the planar base and the removable lid are configured for snap fitting together.

6. The article of claim 1, wherein the planar base does not include any extending walls at the outer peripheral edge.

7. The article of claim 1, wherein the planar base includes a circular ridge.

8. A frozen tissue specimen storage kit comprising:
    a base having a first surface and an opposing second surface and an outer peripheral edge, wherein the second surface includes an area comprising a plurality of protuberances;
    a tissue specimen mold aligned with the area of the second surface of the base;
    a removable lid having: (i) a first side and a second side, wherein the first side defines a continuous planar surface and the second side defines a recessed portion configured to cover a frozen tissue specimen block; and (ii) an outer rim configured to engage with the outer peripheral edge of the base;
    a slotted U-shaped clamp configured to receive the base and the tissue specimen mold; and
    a chuck configured for mounting at least the base onto a cryostat.

9. The kit of claim 8, wherein the outer rim of the removable lid comprises a ridge on only three sides of the removable lid.

10. The kit of claim 8, wherein the second surface of the base comprises a ridge on only three sides of the base configured to receive the tissue specimen mold.

11. The kit of claim 8, wherein the chuck defines a peripheral raised rim that is configured to receive the base.

12. The kit of claim 8, wherein the tissue specimen mold is a circular mold.

* * * * *